June 10, 1947.  C. R. YARD  2,422,062
WATER CONDITIONING MACHINE FOR AN OIL WELL OPERATED BY WATER
FLOWING FROM SAID WELL FOR FEEDING REAGENT TO THE WATER
Filed Aug. 22, 1944  3 Sheets-Sheet 1

TREATED WATER TANK

Inventor
Charles R. Yard

By Clarence A. O'Brien
and Harvey B. Jacobson
Attorneys

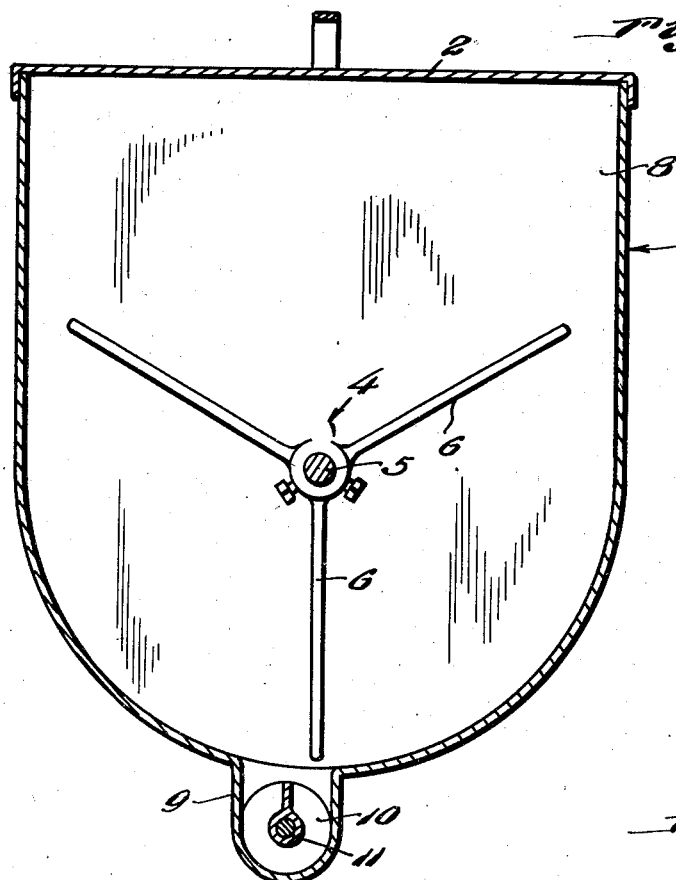

Patented June 10, 1947

2,422,062

UNITED STATES PATENT OFFICE 2,422,062

WATER CONDITIONING MACHINE FOR AN OIL WELL OPERATED BY WATER FLOWING FROM SAID WELL FOR FEEDING REAGENT TO THE WATER

Charles R. Yard, Nowata, Okla.

Application August 22, 1944, Serial No. 550,592

3 Claims. (Cl. 210—16)

1

The present invention relates to new and useful improvements in water treating machines, and has for its primary object to provide, in a manner as hereinafter set forth, a unique apparatus for conditioning water to render it usable for repressuring in oil fields, whereby increased production will be had through what is commonly referred to as the flooding method.

Another very important object of the invention is to provide a machine of the aforementioned character wherein the pressure of the water to be treated is utilized for actuating the mechanism.

Still another very important object of the invention is to provide a machine of the character described comprising novel means for controlling or regulating the feed of the chemical which is mixed with the water.

Other objects of the invention are to provide a water treating machine of the character set forth which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a view in transverse section, taken substantially on the line 3—3 of Figure 2.

Figure 4 is a view in horizontal section, taken substantially on the line 4—4 of Figure 2.

Figure 5 is a detail view in side elevation of the adjustable crank arm.

Figure 1:
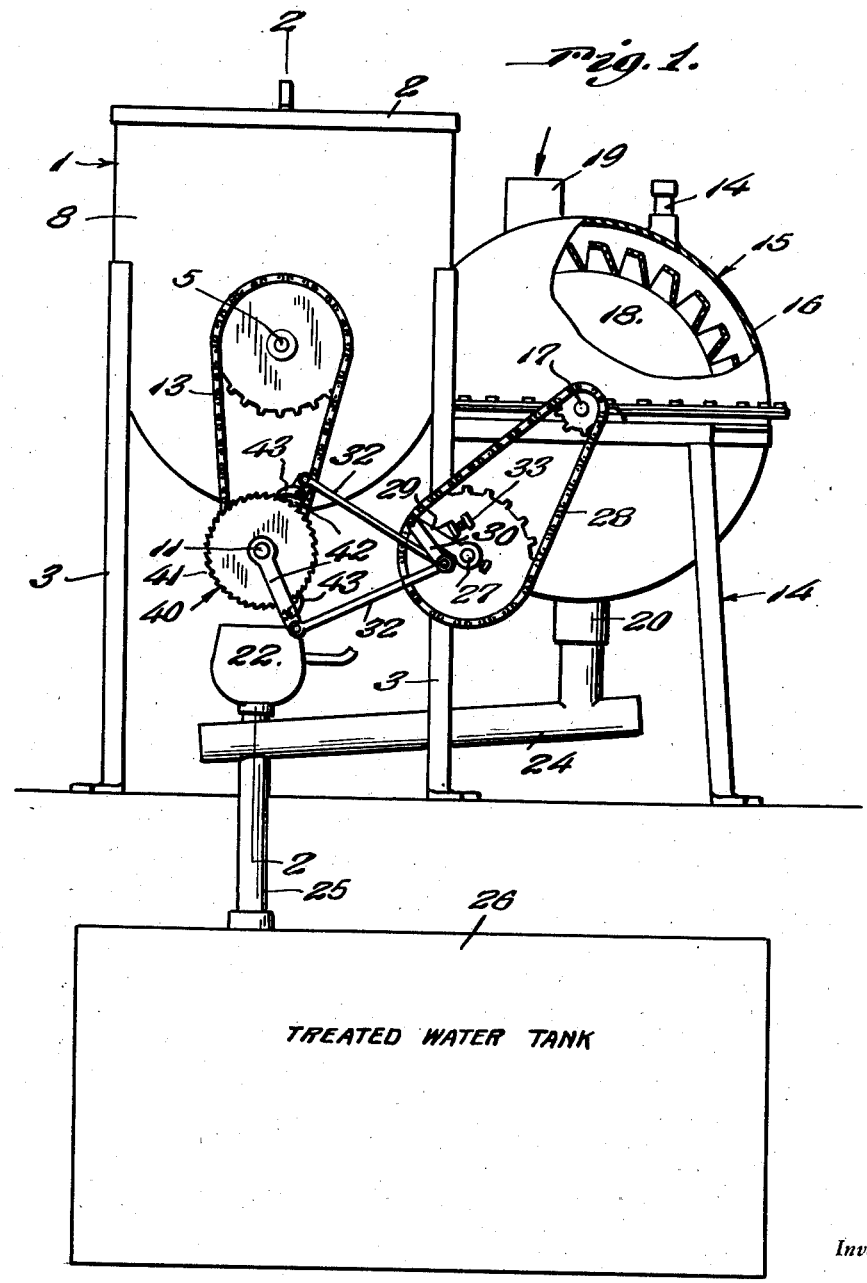
Figure 1 is a view in side elevation of a water treating apparatus constructed in accordance with the present invention, showing a portion broken away in section.

Referring now to the drawings in detail, it will be seen that the embodiment of the invention which has been illustrated comprises a hopper 1 of substantially U-shaped transverse section, as shown to advantage in Figure 3 of the drawings. The hopper 1, which includes a removable cover 2, is mounted on supporting legs 3. Mounted in the hopper 1 is an agitator 4 comprising a shaft 5 having adjustably secured thereon a plurality of fingers 6. The shaft 5 is journaled in suitable bearings 7 which are provided therefor on the opposed walls 8 of the hopper 1.

2

Mounted longitudinally beneath the hopper 1 and communicating therewith is a conduit 9. A screw conveyor 10 is operable in the conduit 9. The shaft 11 of the screw conveyor 10 is journaled in suitable bearings provided therefor in the end members 12 of the conduit 9. The shaft 11 drives the agitator 4 through a chain and sprocket connection 13.

One side of a stand 14 is supported by certain of the hopper legs 3. Mounted on the stand 14 is a water power unit 15. The unit 15 includes a circular housing 16 having journaled therein one end portion of a horizontal shaft 17 which extends across the stand 14. Fixed on the shaft 17 for operation in the housing 16 is a water wheel 18. Rising from the housing 16 is an outlet 19 for connection with the source of water to be treated. An outlet 20 depends from the housing 16.

Figure 2:
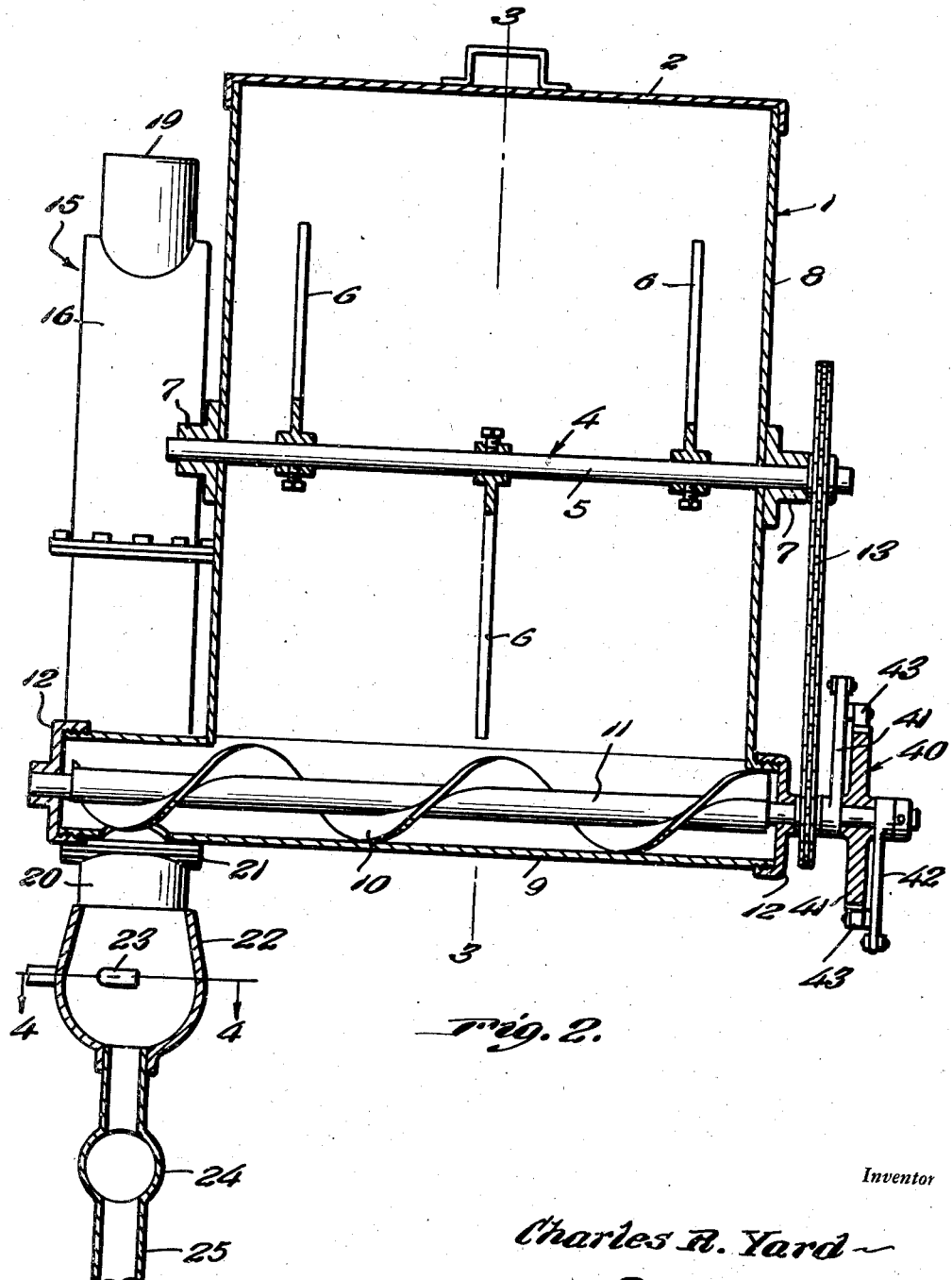
Figure 2 is a vertical sectional view, taken substantially on the line 2—2 of Figure 1.

The conduit 9 has formed in one end portion a discharge opening 21 (see Fig. 2) for the chemical from the hopper 1. A mixing receptacle or bowl 22 is provided for receiving the chemical from the conduit 9. Water under pressure is discharged with a whirling motion into the bowl 22 by a tangential nozzle 23 for thoroughly mixing the chemical in said bowl.

An inclined conduit 24 receives the water from the outlet 20 of the housing 16. The inclined conduit 24 passes beneath the bowl 22 for receiving the chemical therefrom and is connected at 25 to a tank 26.

Journaled on certain of the hopper legs 3 is a horizontal shaft 27. The shaft 17 drives the shaft 27 through a chain and sprocket connection 28. Fixed on the shaft 27 is a crank arm 29.

As illustrated to advantage in Figure 5 of the drawings, the crank arm 29 includes a pivotally adjustable bar 30 having fixed on its free end portion a laterally projecting pin 31. Pitmans 32 have one end journaled on the pin 31. An adjusting screw 33 for the bar 30 is threadedly mounted at 34 on the arm 29. One end portion of the adjusting screw 33 extends loosely through an apertured ear 35 on the bar 30. Washers 36 are provided on the adjusting screw 33 on opposite sides of the ear 35. Retaining nuts 37 anchor the adjusting screw 33 in the ear 35. The end portion of the adjusting screw 33 on which the elements 36 and 37 are mounted is reduced, as at 38, to provide a shoulder which one of said elements 36 abuts.

The pitmans 32 are operatively connected to the shaft 11 of the screw conveyor 10 through the medium of a double pawl and ratchet device 40. The device 40 comprises a ratchet wheel 41 which is fixed on the shaft 11. Levers 42 are journaled on the shaft 11 on opposite sides of the ratchet 41. Pawls 43 are pivotally mounted on the levers 42 and engaged with the ratchet 41. The construction and arrangement, it will be observed, is such that when one of the pawls 43 is receding, the other of said pawls is moving forwardly for actuating the screw conveyor 10.

It is thought that the operation of the machine will be readily apparent from a consideration of the foregoing. Briefly, the chemical is placed in the hopper 1 and gravitates into the conduit 9, clogging being prevented by the agitator 4. The water to be treated enters the housing 16 of the unit 15 at 19 and, in the arrangement shown, actuates the wheel 18 in a counter-clockwise direction. This water, after it leaves the wheel 18, is discharged from the housing 16 at 20 and enters the conduit 24. The water flows down the inclined conduit 24 beneath the bowl 22 and is discharged into the tank 26. The shaft 17 is turned by the water wheel 18 and drives the shaft 27 with the crank arm 29 thereon through the chain and sprocket connection 28. The crank arm 29, in turn, drives the screw conveyor 10 intermittently through the pitmans 32 and the double pawl and ratchet device 40. Thus, the chemical from the hopper 1 is moved in the conduit 9 to the discharge opening 21 through which it gravitates to the mixing bowl 22. From the bowl 22 the chemical gravitates to the conduit 24 where it is mixed with the water as said water flows to the tank 26. By adjusting the free end portion of the bar 30, with the pin 31 thereon, toward or away from the shaft 27 through the medium of the screw 33, the stroke of the pitmans 32 may be lengthened or shortened as desired. In this manner operation of the screw conveyor 10 may be readily controlled for regulating the discharge of the chemical from the hopper 1. The housing 16 of the unit 15 is provided with a vent 44. A lock nut 45 secures the screw 33 in adjusted position.

It is believed that the many advantages of a water treating machine constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. A water treating machine comprising a hopper for the reception of a chemical, a conduit mounted beneath said hopper and communicating therewith for receiving the chemical therefrom, a mixing bowl mounted beneath said conduit for receiving the chemical therefrom, a helical conveyor in the conduit for discharging the chemical into the mixing bowl, a rotatable agitator for the chemical operable in the hopper, chain and sprocket means operatively connecting the conveyor to said agitator, a wheel operable by the water to be treated, a second conduit for receiving the water from the wheel, said second conduit communicating with said mixing bowl, a third conduit for supplying water to said mixing bowl and entering said bowl in substantial tangential position to impart a whirling motion to the water, and drive means including a plurality of pawls movable by said wheel and a ratchet associated with said conveyor connecting said water wheel and said conveyor.

2. A water treating machine comprising a hopper for the reception of a chemical, a conduit mounted beneath the hopper and communicating therewith for receiving the chemical therefrom, a mixing bowl mounted beneath the conduit for receiving the chemical therefrom, a conveyor in the conduit for discharging the chemical into the mixing bowl, a rotatable agitator for the chemical operable in the hopper, chain and sprocket means operatively connecting the conveyor to said agitator, a wheel having an axle operable by the water to be treated, a second conduit for receiving the water from the wheel, said second conduit communicating with said mixing bowl, a third conduit for supplying water to said mixing bowl and entering said bowl in substantially tangential position to impart a whirling motion to the water, and drive means connecting said water wheel and said conveyor, said last mentioned means including a crank arm secured to said axle, a bar pivotally secured at one end to said crank arm, pitmans pivotally secured to the opposite end of said bar, pawls connected to said pitmans, and a ratchet operatively secured to said conveyor.

3. A water treating machine comprising a hopper for the reception of a chemical, a conduit mounted beneath the hopper and communicating therewith for receiving the chemical therefrom, a mixing bowl mounted beneath the conduit for receiving the chemical therefrom, a conveyor in the conduit for discharging the chemical into the mixing bowl, a rotatable agitator for the chemical operable in the hopper, chain and sprocket means operatively connecting the conveyor to said agitator, a wheel having an axle operable by the water to be treated, a second conduit communicating with said mixing bowl, a third conduit for supplying water to said mixing bowl and entering said bowl in substantially tangential position to impart a whirling motion to the water, and drive means connecting said water wheel and said conveyor, said last mentioned means including a crank arm secured to said axle, a bar pivotally secured at one end to said crank arm, pitmans pivotally secured to the opposite end of said bar, pawls connected to said pitmans, and a threaded connection between an intermediate point of said crank and an intermediate point of said bar for varying the relative positions thereof to vary the stroke of said pitmans.

CHARLES R. YARD.

REFERENCES CITED

The following references are of record in the file of this patent:

UNITED STATES PATENTS

| Number | Name | Date |
|---|---|---|
| 851,778 | Schmidt | Apr. 30, 1907 |
| 1,324,508 | Leopold | Dec. 9, 1919 |
| 1,208,058 | Warriner | Dec. 12, 1916 |
| 1,326,553 | Warriner | Dec. 30, 1919 |
| 1,638,119 | Green | Aug. 9, 1927 |
| 2,038,667 | Neff | Apr. 28, 1936 |
| 2,364,488 | Swearingen | Dec. 5, 1944 |

FOREIGN PATENTS

| Number | Country | Date |
|---|---|---|
| 105,849 | Germany | Feb. 4, 1898 |
| 31,059 | Germany | Apr. 15, 1885 |
| 6,785 | Great Britain | 1905 |